US012811910B2

(12) United States Patent
Mundra et al.

(10) Patent No.: US 12,811,910 B2
(45) **Date of Patent: *Nov. 24, 2026**

(54) SYSTEM ON CHIP FIREWALL MEMORY ARCHITECTURE

(71) Applicant: Texas Instruments Incorporated, Dallas, TX (US)

(72) Inventors: Amritpal Singh Mundra, Allen, TX (US); Chunhua Hu, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 162 days.

This patent is subject to a terminal disclaimer.

(21) Appl. No.: 18/783,999

(22) Filed: Jul. 25, 2024

(65) Prior Publication Data

US 2024/0380731 A1 Nov. 14, 2024

Related U.S. Application Data

(63) Continuation of application No. 17/392,497, filed on Aug. 3, 2021, now Pat. No. 12,101,293, which is a (Continued)

(51) Int. Cl.
*H04L 29/06* (2006.01)
*G06F 21/71* (2013.01)
(Continued)

(52) U.S. Cl.
CPC .......... *H04L 63/0218* (2013.01); *G06F 21/71* (2013.01); *G06F 21/76* (2013.01); *G06F 21/85* (2013.01); *H04L 63/0227* (2013.01)

(58) Field of Classification Search
CPC ..... H04L 63/0218; G06F 21/71; G06F 21/76; G06F 21/85
See application file for complete search history.

(56) References Cited

U.S. PATENT DOCUMENTS 6,321,314 B1 11/2001 Van Dyke
6,678,825 B1 * 1/2004 Ellison .................... G06F 21/74 710/200
(Continued)

FOREIGN PATENT DOCUMENTS

CA 2847929 A1 * 1/2009 ......... H04L 41/0803
CN 1462536 A * 12/2003 ......... H04L 63/0227
(Continued)

OTHER PUBLICATIONS

Extended European Search report T79612EP01.

*Primary Examiner* — Sher A Khan
(74) *Attorney, Agent, or Firm* — Michael T. Gabrik; Charles F. Koch

(57) ABSTRACT

Systems and methods provide unified control of firewalls of functional units distributed throughout a system-on-a-chip (SoC) using a configuration controller and security bus. Such unified control enables configuration of a memory to provide a unified view configuration memories of the firewalls, regardless of the locations of the firewalls in the SoC. An example system providing such control includes multiple functional units including multiple firewalls, respectively, in which each firewall stores configuration data for a corresponding functional unit of the functional units; a first bus coupled to the functional units; a second bus that is coupled to the functional units and is electrically isolated from the first bus; and a configuration controller coupled to the second bus and configured to use the second bus to control the configuration data that is stored in each of the firewalls.

19 Claims, 3 Drawing Sheets

Related U.S. Application Data continuation of application No. 16/221,318, filed on Dec. 14, 2018, now Pat. No. 11,115,383.

(60) Provisional application No. 62/676,050, filed on May 24, 2018.

(51) Int. Cl.

| | |
|---|---|
| ***G06F 21/76*** | (2013.01) |
| ***G06F 21/85*** | (2013.01) |
| ***H04L 9/40*** | (2022.01) |

(56) References Cited

U.S. PATENT DOCUMENTS

| | | | | |
|---|---|---|---|---|
| 6,795,905 | B1 | 9/2004 | Ellison | |
| 7,543,331 | B2 * | 6/2009 | Saltz | G06F 9/468 713/153 |
| 8,307,416 | B2 | 11/2012 | Conti | |
| 8,356,184 | B1 | 1/2013 | Meyer | |
| 8,806,140 | B1 | 8/2014 | Kraipak | |
| 8,874,926 | B1 | 10/2014 | Edwards | |
| 9,305,142 | B1 | 4/2016 | Ybarra | |
| 9,391,955 | B2 * | 7/2016 | Halabi | H04L 63/0227 |
| 9,967,236 | B1 * | 5/2018 | Ashley | H04L 63/20 |
| 10,447,470 | B2 * | 10/2019 | Viswanathan | B63G 8/001 |
| 2005/0021874 | A1 * | 1/2005 | Georgiou | G06F 15/167 709/250 |
| 2005/0147100 | A1 | 7/2005 | Biran | |
| 2007/0011419 | A1 | 1/2007 | Conti | |
| 2007/0022479 | A1 | 1/2007 | Sikdar | |
| 2007/0101414 | A1 | 5/2007 | Wing | |
| 2007/0174429 | A1 | 7/2007 | Mazzaferri | |
| 2007/0250912 | A1 | 10/2007 | Rassool | |
| 2008/0163353 | A1 | 7/2008 | Conti | |
| 2009/0025077 | A1 | 1/2009 | Trojanowski | |
| 2009/0049220 | A1 | 2/2009 | Conti | |
| 2009/0177826 | A1 | 7/2009 | Conti | |
| 2011/0016284 | A1 | 1/2011 | Balan | |
| 2011/0145909 | A1 | 6/2011 | Rachakonda | |
| 2012/0047366 | A1 | 2/2012 | Yoo | |
| 2012/0202495 | A1 | 8/2012 | Gehlen | |
| 2012/0311690 | A1 | 12/2012 | Ellis | |
| 2012/0317224 | A1 * | 12/2012 | Caldwell | H04W 72/542 709/217 |
| 2013/0133080 | A1 * | 5/2013 | Yuki | G06F 21/10 726/27 |
| 2014/0223569 | A1 | 8/2014 | Gail | |
| 2015/0006805 | A1 | 1/2015 | Feekes | |
| 2015/0277949 | A1 | 10/2015 | Loh | |
| 2016/0004647 | A1 | 1/2016 | Eppensteiner | |
| 2016/0028728 | A1 | 1/2016 | Hampel | |
| 2016/0094552 | A1 | 3/2016 | Durham | |
| 2016/0371139 | A1 | 12/2016 | Stark | |
| 2017/0004074 | A1 | 1/2017 | Frazier | |
| 2017/0195884 | A1 | 7/2017 | Kang | |
| 2017/0344502 | A1 | 11/2017 | Fernald | |
| 2018/0063100 | A1 | 3/2018 | Peeters | |
| 2018/0097788 | A1 * | 4/2018 | Murthy | H04L 63/102 |
| 2018/0191677 | A1 * | 7/2018 | Roychoudhury | H04L 61/5046 |
| 2018/0212839 | A1 | 7/2018 | Hiers | |
| 2018/0343234 | A1 * | 11/2018 | Letey | G06F 21/53 |
| 2019/0095655 | A1 | 3/2019 | Krawczewicz | |

FOREIGN PATENT DOCUMENTS

| | | | | | |
|---|---|---|---|---|---|
| CN | 102387135 | B | * | 1/2015 | |
| CN | 105577628 | A | * | 5/2016 | H04L 9/40 |
| CN | 106453333 | A | * | 2/2017 | H04L 63/0263 |
| CN | 105183373 | B | | 11/2018 | |
| CN | 109791594 | B | | 10/2020 | |
| EP | 1619572 | A1 | | 1/2006 | |
| EP | 3026863 | A1 | * | 6/2016 | H04L 67/12 |
| KR | 20060096986 | A | * | 9/2006 | H04L 63/0227 |
| WO | 03069909 | W | | 8/2003 | |
| WO | 2008081032 | A | | 4/2008 | |
| WO | 2009023629 | A2 | | 2/2009 | |
| WO | 2012127266 | A1 | | 9/2012 | |
| WO | WO-2016109071 | A1 | * | 7/2016 | G06F 21/79 |

* cited by examiner

SYSTEM ON CHIP FIREWALL MEMORY ARCHITECTURE

CROSS-REFERENCE TO RELATED APPLICATIONS

This application is a continuation of U.S. patent application Ser. No. 17/392,497, filed Aug. 3, 2021, which is a continuation of U.S. patent application Ser. No. 16/221,318, filed Dec. 14, 2018, which claims priority to U.S. Provisional Patent Application No. 62/676,050, filed May 24, 2018. U.S. patent application Ser. No. 16/221,318 is related to U.S. patent application Ser. No. 15/679,307, filed Aug. 17, 2017. Each of the above-identified applications is incorporated by reference herein.

BACKGROUND

This application relates generally to hardware-based security in integrated circuit (IC) devices, and more particularly to memory and bus architecture of hardware-based security.

A system on a chip (SoC) comprises multiple functional blocks, with different functional blocks—and, typically, different sub-blocks within functional blocks—having different functions. For example, functional blocks or sub-blocks (for convenience, collectively referred to as "functional blocks" herein) on an SoC can include one or more microcontrollers, microprocessors, or digital signal processor (DSP) cores; memory blocks, such as read-only memory (ROM) or random-access memory (RAM); clock signal generators; input/output (I/O) interfaces; analog interfaces; voltage regulators and power management circuits; and intellectual property (IP) cores. Hardware-based security, i.e., controlling at a hardware level the message flow among functional blocks, can be used to harden an SoC against attackers attempting to gain unauthorized access to (for example) message contents, memory contents, device functions, and device I/O and corresponding communication permissions.

SUMMARY

In an example, a system, e.g., an SoC, includes a plurality of functional units including a plurality of firewalls, respectively, in which each firewall stores configuration data for a corresponding functional unit; a first bus coupled to the plurality of functional units; a second bus that is coupled to the plurality of functional units and is electrically isolated from the first bus; and a configuration controller coupled to the second bus and configured to use the second bus to control the configuration data that is stored in each of the plurality of firewalls.

DETAILED DESCRIPTION

Robust system on a chip (SoC) hardware-based security can use hardware-enforced mutual isolation of different functional blocks from each other. That is, messages sent by a functional block at a corresponding security level or within a corresponding secure region of the SoC should be restricted from accessing resources within a functional block at a different security level or within a different secure region of the SoC. Restriction can depend, for example, on properties (such as permissions, encryption, and cryptographic key accessibility) of respective messages, sending functional blocks, and receiving functional blocks.

Figure 1:
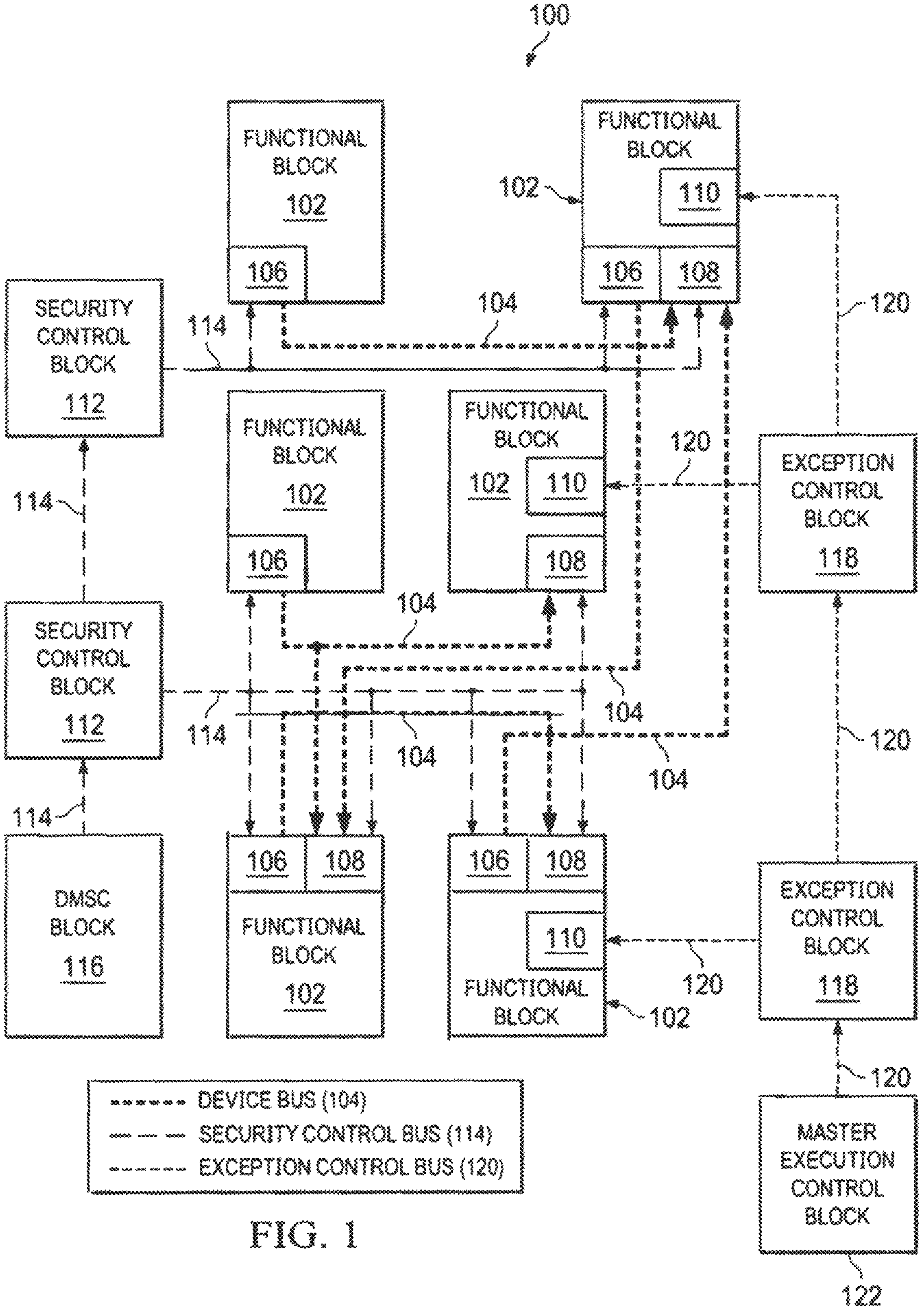
FIG. 1 shows an example of a functional block layout of an SoC.

FIG. 1 shows an example of a functional block layout of an SoC 100. As shown in FIG. 1, various functional blocks 102 in the SoC 100 are connected to each other by a device bus 104. A few functional blocks 102 are shown. The number of functional blocks 102 in an SoC can vary. The device bus 104 refers to the bus or busses which connect(s) the various non-security and non-security exception functional blocks 102. In typical prior art embodiments, a device bus 104 also connects to security and security exception blocks. Messages between functional blocks 102 are generally transmitted through the device bus 104. Some (or all) functional blocks 102 contain initiator-side firewall blocks 106, which apply security-related content (such as an identifier (ID) of the functional block 102 which originated the message, and encryption) to messages to prepare messages for transmission to other functional blocks 102. Some (or all) functional blocks 102 contain receiver-side firewall blocks 108, which determine (such as by checking the ID attached to the message by the corresponding initiator-side firewall block 106) whether a message has permission to be accessed by a respective functional block 102 receiving the message (for example, to execute the contents of the message or to pass the message to a downstream recipient), and to enable such access if permission is confirmed. Access by the respective functional block 102 refers to permission for the message to be acted upon by resources of the functional block 102 other than (in addition to) (1) resources included within a corresponding receiver-side firewall block 108, and/or (2) resources which were utilized by the corresponding receiver-side firewall block 108 in determining whether the message has access permission for the functional block 102. One or more functional blocks 102 also contain exception probe blocks 110 connected to initiator-side firewall blocks 106 and/or receiver-side firewall blocks 108 within the same functional block 102. Exception probe blocks 110 include memory elements which store configuration information for respective exception probe blocks 110.

Initiator-side firewall blocks 106 and receiver-side firewall blocks 108 are controlled by (subsidiary) security control blocks 112. Security control blocks 112 are connected to each other, and are connected to control initiator-side and receiver-side firewall blocks 106, 108, by a security control bus 114. Initiator-side firewall blocks 106 and receiver-side firewall blocks 108 (collectively, "firewall blocks" 106, 108) include memory elements which store configuration information for respective firewall blocks 106, 108. Security control blocks 112 also include memory elements which store configuration information for respective security control blocks 112; configuration information for security control blocks 112 is typically pre-set by hardware design for security purposes. Configuration information can determine, for example, whether and how different permission levels (such as user, supervisor, and debug modes) are applied to messages. The security control bus 114 is electrically isolated from the device bus 104, to prevent unauthorized access to the security control bus 114 (that is, the security control bus 114 is dedicated specifically to connecting security infrastructure; messages are not sent between functional blocks 102 via the security control bus 114). Accordingly, security control bus 114 interconnects are independent from device bus 104 interconnects. Security control blocks 112 are controlled by a single, exclusive device management and security control (DMSC) block 116. The DMSC block 116 is connected to control the security control blocks 112, and to control initiator-side and receiver-side firewall blocks 106, 108 (via the security control blocks 112), by the security control bus 114. The DMSC block 116 being a "single, exclusive" block refers to device structure underlying DMSC functionality being connected so that there are not multiple, independently operating loci of DMSC functionality (accordingly, there is a "single," not "multiple," DMSC blocks 116). This can be seen as DMSC functionality being connected serially, not in parallel, as seen from the security control blocks 112. The DMSC block 116 is capable of causing changes to configuration data stored in the memory elements of the firewall blocks 106, 108.

As can be seen from FIG. 1, firewall blocks 106, 108 are generally distributed throughout an SoC 100 employing hardware-based security. Use of the DMSC block 116 as a unified control for security infrastructure of the SoC 100, along with an independent security control bus 114, enables configuration of memory so that software can view memory elements of the initiator-side and receiver-side firewall blocks 106, 108 (together, firewall blocks 106, 108), as comprising a single, unified, contiguous memory region, as further described with respect to FIG. 2.

Exception probe blocks 110 determine when an exception occurs in initiator-side or receiver-side firewall blocks 106, 108. Exception probe blocks 110 are controlled by exception control blocks 118. Exception probe blocks 110 include memory elements which store configuration information of the exception probe blocks 110. Exception control blocks 118 are connected to each other, and are connected to control the exception probe blocks 110, by an exception control bus 120. The exception control bus 120 is electrically isolated from the device bus 104, and from the security control bus 114, to prevent unauthorized access to the exception control bus 120.

Initiator-side firewall blocks 106 can be configured to, for example, assign unique security IDs to and/or assert security attributes of messages between functional blocks 102. Receiver-side firewall blocks 108 can be configured to, for example, set permissions corresponding to source functional blocks 102 or other properties of messages which are (or are not) allowed to access corresponding destination functional blocks 102.

Figure 2:
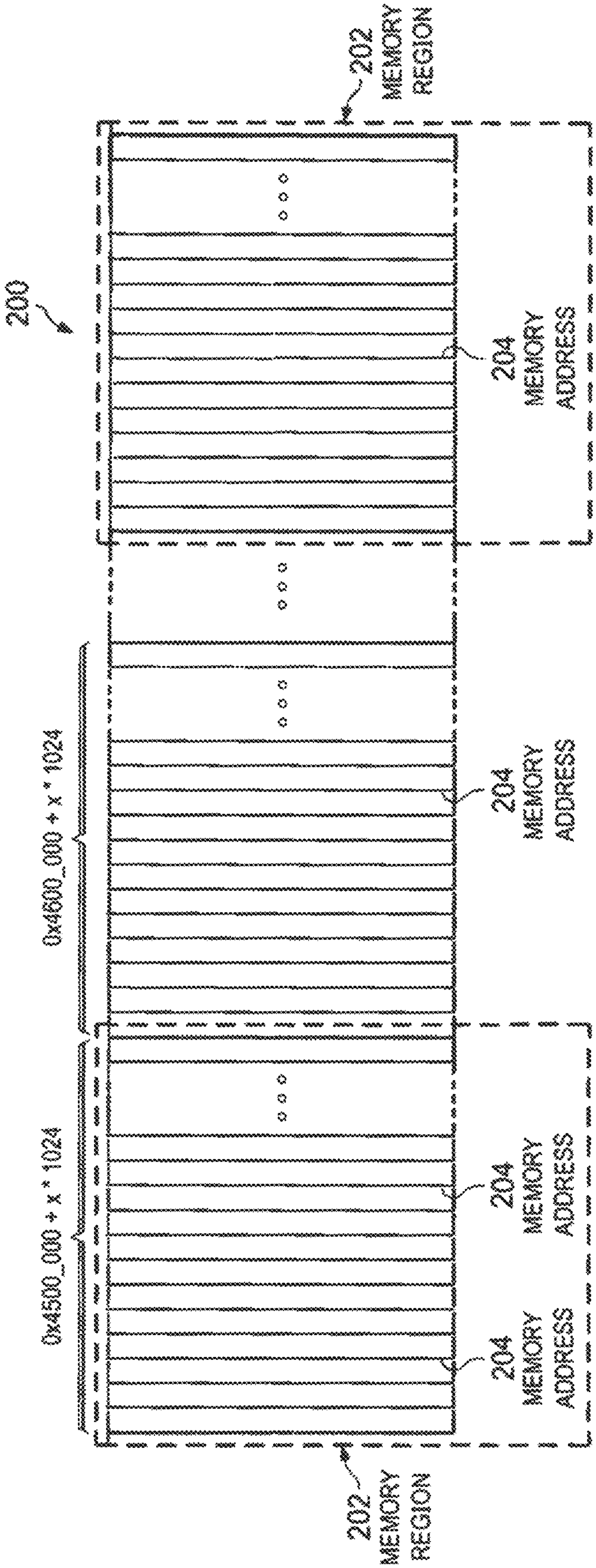
FIG. 2 shows an example map of a memory used to access the various memories of firewall blocks.

FIG. 2 shows an example map of a memory 200 used to access the various memories of firewall blocks 106, 108. The memory 200 spans a fixed range within a memory of the SoC 100. The memory 200 contains multiple memory regions 202 (divided depending on, for example, the requirements of the particular SoC 100) storing pointers to the locations of the various memories of the firewall blocks 106, 108. Different memory regions 202 contain pointers to locations of memories corresponding to different types of functions (different subsystems) of the firewall blocks 106, 108. For example, memory regions 202 can correspond to (contain pointers enabling access to) security configuration data for initiator-side and receiver-side firewall blocks 106, 108, security configuration data for security control blocks 112, exception configuration data for initiator-side and receiver-side firewall blocks 106, 108, boot control configuration data, emulation configuration data, virtualization configuration data, and quality-of-service (QOS) configuration data. Accordingly, the memory 200 acts as a middleman (intermediary) between (1) software and (2) firewall block 106, 108 configuration memories.

Each firewall block 106, 108 is allocated a different identifier (ID). Identical initiator-side firewall block 106 designs and identical receiver-side firewall block 108 designs can be used across a platform comprising multiple SoCs 100. This enables IDs to be allocated globally for all firewall blocks 106, 108 in all SoCs 100 in the same platform, so that identically situated (e.g., with respect to a particular subsystem type of functional block 102), identically designed firewall blocks 106, 108 in different SoCs in a platform can receive the same ID. Having the same ID enables the memory elements of identically situated, identically designed firewall blocks 106, 108 in different SoCs in a platform to be called the same way by software. Global assignment of IDs can simplify configuration of firewall blocks 106, 108 in SoCs throughout a platform: often, it is advantageous to identically configure identically-designed firewall blocks 106, 108. This is facilitated by the ability to access firewall blocks 106, 108 on different SoCs in the same way. Global assignment of IDs also enables a provision to software of a consistent view of configuration of firewall blocks 106, 108 (with configuration memory consistently and predictably addressable based on firewall block 106, 108 ID) when there are multiple types of firewall blocks 106, 108. This consistent view of configuration memory can also be provided when the number of firewall blocks 106, 108 varies from SoC to SoC across a platform (pre-allocated address space for a type of firewall blocks 106, 108 (such as boot control or QoS) can be sized to accommodate the number of that type of firewall blocks 106, 108 being used).

Types of firewall blocks 106, 108 can include, for example, memory region firewall blocks and channelized firewall blocks. Memory region firewall blocks can, for example, serve functional blocks (memories) as a whole, or enable different permissions for different regions of corresponding memories. For example, a Host-1 can have full access to a memory behind a memory region firewall block, while a Host-2 has only a window view of the memory behind the memory region firewall block. Channelized firewall blocks are typically fine-grained, with larger numbers of firewall structures gating access to respective, relatively finely-divided portions of the memory.

IDs can be encoded in register transfer level (RTL) configuration files, with IDs fixed for respective SoCs. RTL automation scripts can be used to determine memory addresses corresponding to respective IDs as described below.

Each firewall block 106, 108 ID can be used to create, for each memory region 202 storing security configuration data, a memory address 204 that corresponds uniquely (on the corresponding SoC 100) to that firewall block 106, 108. This can be done using a pre-defined mathematical calculation. For example, pointers to memory elements in a memory region 202 storing configuration data for different firewall blocks 106, 108 can be addressed so that a first bit of stored pointer information for one firewall block 106, 108 is 1024 bits away from a first bit of adjacently-stored pointer information for another firewall block 106, 108. Accordingly, an example 48 bit address for a firewall block 106, 108 can be configured to be calculated as: for firewall block 106, 108 numbered "x" (x≥0), address=0x4500_0000+x*1024. This can be used to create a memory map for secure configuration data that is unified and contiguous, so that software can access security asset memory as if it were located in a single, compact memory space, rather than distributed across the SoC.

This can also be done for memory regions 202 storing pointers to configuration memories for exception control blocks 110. Exception control blocks 118 and exception probe blocks 110 are connected by an exception control bus 120 which is electrically isolated from the device bus 104 and the security control bus 114, and configuration of exception probe blocks 110 is controlled by a single master exception control block 122 (similarly to control of configuration of firewall blocks 106, 108 by the DMSC block 116). Pointers to configuration memories of different groups of blocks are stored in memory regions 202 with different base addresses, and different groups of blocks have different respective ID ranges to generate memory addresses within respective memory regions 202 corresponding to respective blocks.

A unified, contiguous memory map enables software designed for firewall blocks 106, 108 having designs which are reused from system to system (which can save hardware design resources) to also be reused from system to system. For example, consider a first SoC which uses four initiator-side firewall blocks 106 and two receiver-side firewall blocks 108, and a second SoC which uses six initiator-side firewall blocks 106 and five receiver-side firewall blocks 108. If the firewall block 106, 108 designs from the first SoC are reused for the second SoC, then security configuration software for the second SoC can reuse the security configuration software for the first SoC, and (with respect to firewall blocks 106, 108) only needs to add code to address the newly added two initiator-side firewall blocks 106 (six minus four) and three receiver-side firewall blocks 108 (five minus two). This can save software design resources, reducing design cost, complexity, and the time it takes to launch a corresponding product. Reduction in complexity can, in turn, reduce the likelihood of design errors, further reducing costs and product launch time.

Figure 3:
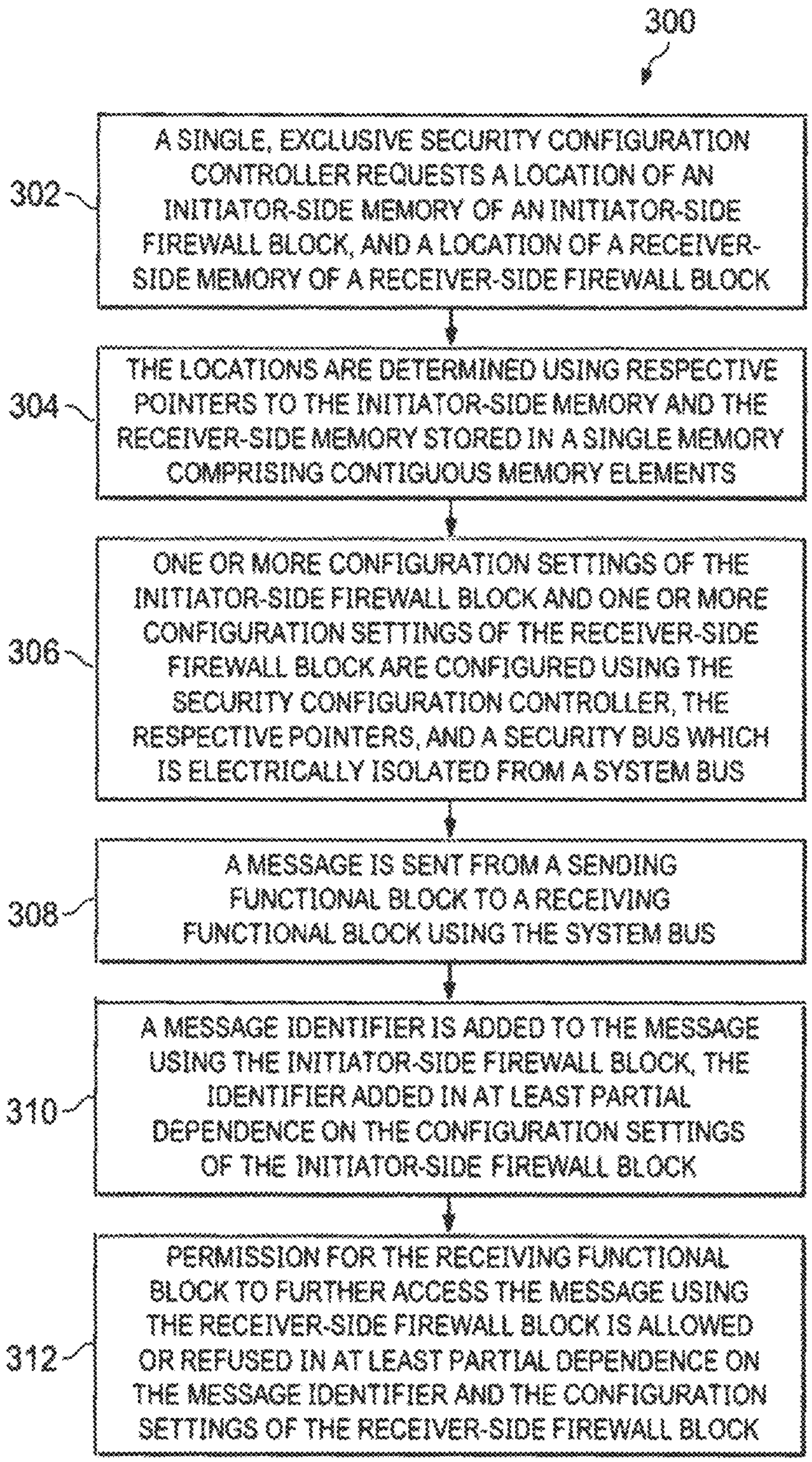
FIG. 3 shows an example of a process for sending messages between functional blocks in an SoC.

FIG. 3 shows an example of a process 300 for sending messages between functional blocks in an SoC. In step 302, a single, exclusive security configuration controller requests a location of an initiator-side memory of an initiator-side firewall block, and a location of a receiver-side memory of a receiver-side firewall block. In step 304, the locations are determined using respective pointers to the initiator-side memory and the receiver-side memory stored in a single memory comprising contiguous memory elements. Addresses of the pointers within the single memory are determined in at least partial dependence on respective unique firewall identifiers of the initiator-side firewall block and of the receiver-side firewall block. In step 306, one or more configuration settings of the initiator-side firewall block and one or more configuration settings of the receiver-side firewall block are configured using the security configuration controller, the respective pointers, and a security bus which is electrically isolated from a system bus. In step 308, a message is sent from a sending functional block to a receiving functional block using the system bus. In step 310, a message identifier is added to the message using the initiator-side firewall block, the identifier added in at least partial dependence on the configuration settings of the initiator-side firewall block. In step 312, permission for the receiving functional block to further access the message using the receiver-side firewall block is allowed or refused in at least partial dependence on the message identifier and the configuration settings of the receiver-side firewall block.

Modifications are possible in the described embodiments, and other embodiments are possible, within the scope of the claims.

In some embodiments, use of globally-allocated firewall block IDs simplifies creation of chip support library (CSL) files.

In some embodiments, ID ranges in a memory are reserved for future expansion.

In some embodiments, multiple secure worlds, corresponding to multiple different security levels, co-exist within an SoC. In some embodiments, whether and how different secure worlds are used is determined by firewall block configuration information.

In some embodiments, one or more firewall blocks are not contained within a functional block.

In some embodiments, the DMSC block sets one configuration of one firewall block at a time. In some embodiments, the DMSC block sets one configuration of multiple firewall blocks at a time. In some embodiments, the DMSC block sets multiple configurations of one firewall block at a time. In some embodiments, the DMSC block sets multiple configurations of multiple firewall blocks at a time.

In some embodiments, the DMSC block can set configuration information of security control blocks.

What is claimed is:

1. A system comprising:

a plurality of functional units including a plurality of firewalls, respectively, in which each firewall stores configuration data for a corresponding functional unit of the plurality of functional units, in which the plurality of functional units include first and second functional units that include first and second firewalls, respectively, the first firewall has a first configuration memory and a first identifier associated therewith, and the second firewall has a second configuration memory and a second identifier associated therewith, wherein the first firewall is configured to apply the first identifier to a message directed to the second functional unit, and the second firewall is configured to determine whether the second functional unit is permitted to access the message based on the first identifier and configuration data stored in the second firewall;

a first bus coupled to the plurality of functional units;

a second bus that is coupled to the plurality of functional units and is electrically isolated from the first bus; and a configuration controller coupled to the second bus and configured to use the second bus to control the configuration data that is stored in each of the plurality of firewalls.

2. The system of claim 1, further comprising a memory, wherein: the plurality of firewalls include, in addition to the first and second firewalls, a set of firewalls, each of which has a configuration memory and an identifier associated therewith; and the memory is configured to store pointers at respective memory addresses to the respective configuration memories based on the respective identifiers.

3. The system of claim 1, wherein the first bus includes a device bus used by the plurality of functional units to communicate with each other via messages, and the second bus includes a security control bus configured to be used exclusively for controlling the configuration data that is stored in each of the plurality of firewalls.

4. The system of claim 1, wherein: the first identifier is associated with a function of the first functional unit; and the second identifier is associated with a function of the second functional unit.

5. The system of claim 1, wherein the configuration controller is configured to:

write first configuration data to the first configuration memory using the pointer associated with the first firewall; and write second configuration data to the second configuration memory using the pointer associated with the second firewall.

6. The system of claim 5, wherein the first identifier includes a permission level for the message directed to the second functional unit, the permission level being based on the configuration data written to the first configuration memory by the configuration controller.

7. The system of claim 5, further comprising:
an exception controller; and a third bus coupled to the exception controller;
wherein at least one of the first functional unit and the second functional unit includes an exception probe memory coupled to the third bus, the exception probe memory configured to store configuration information.

8. The system of claim 7, wherein the exception controller is configured to control the configuration information.

9. The system of claim 7, wherein the third bus is electrically isolated from each of the first bus and the second bus.

10. The system of claim 7, wherein the memory is configured to store a pointer to the exception probe memory.

11. The system of claim 2, wherein the memory includes a contiguously addressed set of memory elements configured to store the pointers, each pointer pointing to a location of a respective configuration memory of the plurality of firewalls.

12. The system of claim 2, wherein the memory includes a plurality of memory regions, each corresponding to a respective configuration memory.

13. The system of claim 2, wherein the memory is configured to provide the configuration controller with a view of all configuration memories in a contiguous memory space.

14. A method comprising:
determining, by a configuration controller, a location of a first configuration memory of a first firewall of a first functional unit using a first pointer stored in a memory;
determining, by the configuration controller, a location of a second configuration memory of a second firewall of a second functional unit using a second pointer stored in the memory;
configuring, by the configuration controller via a security bus, one or more configuration settings of the first configuration memory;
configuring, by the configuration controller via the security bus, one or more configuration settings of the second configuration memory;
sending a message, by the first functional unit to the second functional unit, in which the first firewall applies an identifier to the message;
receiving the message, by the second functional unit; and
determining, by the second firewall, whether the second functional unit has permission to access the message based on the identifier and the configuration settings of the second configuration memory.

15. The method of claim 14, wherein the memory is comprised of portions including a first portion that is associated with the first configuration memory and a second portion that is associated with the second configuration memory.

16. The method of claim 15, wherein:
the identifier is a first identifier associated with the first firewall;
the second firewall has a second identifier associated therewith;
an address of the first pointer in the memory is based at least in part on the first identifier; and
an address of the second pointer in the memory is based on the second identifier.

17. The method of claim 14, wherein the sending of the message is performed using a device bus that is electrically isolated from the device bus.

18. The method of claim 14, wherein the identifier is associated with a function of the first functional unit.

19. The method of claim 14, wherein the identifier includes a permission level for the message.

* * * * *